US012670153B1

(12) United States Patent
Dhawan et al.

(10) Patent No.: US 12,670,153 B1
(45) Date of Patent: Jun. 30, 2026

(54) METHOD AND SYSTEM FOR MATCHING CUSTOMER QUERIES ACROSS DIVERSE DIGITAL CHANNELS WITH A RESPONSE IN A MULTICHANNEL CONTACT CENTER

(71) Applicant: NICE LTD., Ra'anana (IL)

(72) Inventors: Salil Dhawan, Pune (IN); Nishu Bansal, Pune (IN); Ashish Khatri, Pune (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 19/200,747

(22) Filed: May 7, 2025

(51) Int. Cl.
| | |
|---|---|
| *G06F 16/2452* | (2019.01) |
| *G06F 16/28* | (2019.01) |
| *G06F 16/9535* | (2019.01) |
| *G06F 40/284* | (2020.01) |
| *G06F 40/289* | (2020.01) |
| *G06F 40/30* | (2020.01) |

(52) U.S. Cl.
CPC ........ *G06F 16/2452* (2019.01); *G06F 16/285* (2019.01); *G06F 16/9535* (2019.01); *G06F 40/284* (2020.01); *G06F 40/289* (2020.01); *G06F 40/30* (2020.01)

(58) Field of Classification Search
CPC ............... G06F 16/2452; G06F 16/285; G06F 16/9535; G06F 40/284; G06F 40/289; G06F 40/30
See application file for complete search history.

(56) References Cited

U.S. PATENT DOCUMENTS

| | | | | |
|---|---|---|---|---|
| 8,775,409 | B1 * | 7/2014 | Mehta | G06F 16/951 |
| | | | | 707/713 |
| 8,903,792 | B2 * | 12/2014 | Maghoul | G06F 16/9537 |
| | | | | 707/706 |
| 10,216,845 | B2 * | 2/2019 | Vijayaraghavan | G06F 16/951 |
| 11,194,878 | B2 * | 12/2021 | Safronov | G06F 18/2113 |
| 11,397,737 | B2 * | 7/2022 | Zhong | G06F 16/2428 |
| 11,841,866 | B2 * | 12/2023 | Stegman | G06F 16/24578 |

(Continued)

FOREIGN PATENT DOCUMENTS

AU      2023233186   B1 *   1/2025       G06F 16/9538

*Primary Examiner* — Mark E Hershley
(74) *Attorney, Agent, or Firm* — SOROKER NORDMAN RIBA

(57) ABSTRACT

A computerized-method for matching customer queries across diverse digital channels with a response in a multichannel contact center. The computerized-method includes: (i) continuously receiving queries from customers via digital communication channels; in each preconfigured time-window: (ii) converting each customer query in the received queries into a high-dimensional vector representation and scoring the customer query to yield a similarity score by operating a semantic embedder module; (iii) clustering each customer query based on the high-dimensional vector representation and the similarity score by operating a AIQA module to yield clusters of customer queries with semantic similarity; (iv) matching each cluster of customer queries with the response based on a preconfigured threshold by operating a CVSE; (v) automatically generating a notification for each customer query based on the matched response by operating a notification module; and (vi) automatically sending the notification to each customer that is associated with the customer query.

8 Claims, 15 Drawing Sheets

<u>100</u>

(56)          References Cited

U.S. PATENT DOCUMENTS

| | | | | |
|---|---|---|---|---|
| 12,373,441 | B1 * | 7/2025 | Bhat | G06F 16/2237 |
| 12,525,343 | B2 * | 1/2026 | Bell | G06Q 10/06316 |
| 2017/0032027 | A1 * | 2/2017 | Mauro | H04M 3/5191 |
| 2021/0134273 | A1 * | 5/2021 | Mallinar | G06F 18/2155 |
| 2021/0149963 | A1 * | 5/2021 | Agarwal | G06F 16/90332 |
| 2022/0327130 | A1 * | 10/2022 | Zhong | G06F 16/248 |
| 2023/0252049 | A1 * | 8/2023 | Na | G06F 16/24539 |
| | | | | 707/737 |
| 2024/0406166 | A1 * | 12/2024 | Bell | G16H 40/20 |
| 2025/0284691 | A1 * | 9/2025 | Ritter | G06F 16/2455 |
| 2025/0315492 | A1 * | 10/2025 | Lyer | G06F 16/9538 |
| 2025/0348550 | A1 * | 11/2025 | So | G06F 16/3347 |

* cited by examiner

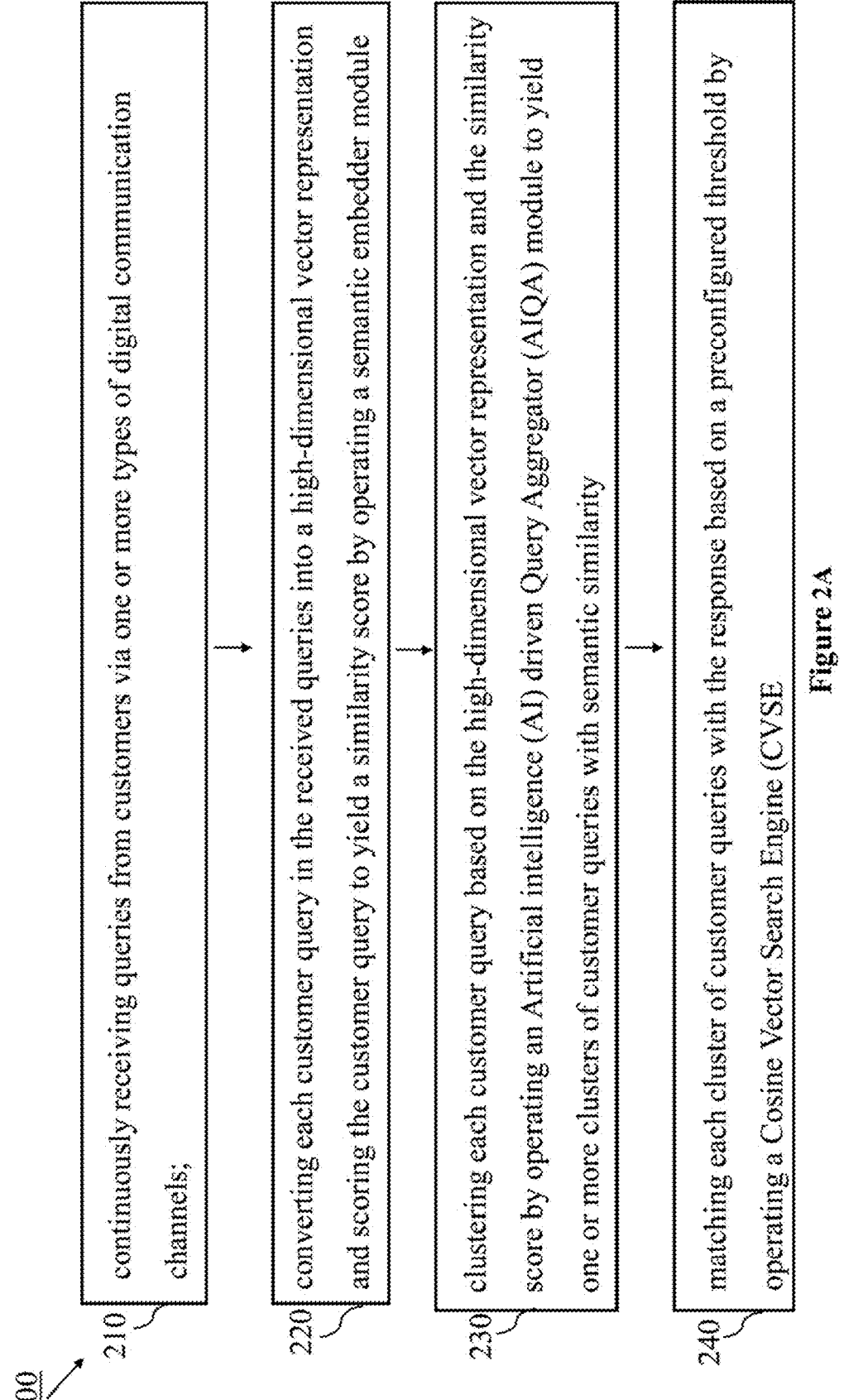

210 continuously receiving queries from customers via one or more types of digital communication channels;

220 converting each customer query in the received queries into a high-dimensional vector representation and scoring the customer query to yield a similarity score by operating a semantic embedder module 230 clustering each customer query based on the high-dimensional vector representation and the similarity score by operating an Artificial intelligence (AI) driven Query Aggregator (AIQA) module to yield one or more clusters of customer queries with semantic similarity 240 matching each cluster of customer queries with the response based on a preconfigured threshold by operating a Cosine Vector Search Engine (CVSE

200

Figure 2A 250 automatically generating a notification for each customer query based on the matched response by operating a notification module 260 automatically sending the notification to each customer that is associated with the customer query.

200

1300B

METHOD AND SYSTEM FOR MATCHING CUSTOMER QUERIES ACROSS DIVERSE DIGITAL CHANNELS WITH A RESPONSE IN A MULTICHANNEL CONTACT CENTER

COPYRIGHT NOTICE

TECHNICAL FIELD

The present disclosure relates to the field of matching customer queries across diverse digital channels with a response in a multichannel contact center.

BACKGROUND

In contact centers customer queries across digital channels lack standardization, making them hard to analyze and match. Current systems fail to efficiently identify similar queries, leading to operational bottlenecks. The impact on customers is increased wait times and abandonment rates, as well as repeated attempts through multiple channels for a single query. The impact on the contact centers is misrepresented workloads and inefficiency in agent utilization as well as decline in service quality and productivity. The business impact is redundant queries increase workload by 30-40% as well as poor management leads to 25% higher abandonment rates and 15-20% higher costs annually.

Therefore, there is a need for a technical solution that will seamlessly match similar queries across channels, accelerate query resolution and improve customer satisfaction and boost agent productivity while optimizing resource use.

SUMMARY

There is thus provided, in accordance with some embodiments of the present disclosure, a computerized-method for matching customer queries across diverse digital channels with a response in a multichannel contact center.

In accordance with some embodiments of the present disclosure, the computerized-method may include: (i) continuously receiving queries from customers via one or more types of digital communication channels; in each preconfigured time-window: (ii) converting each customer query in the received queries into a high-dimensional vector representation and scoring the customer query to yield a similarity score by operating a semantic embedder module; (iii) clustering each customer query based on the high-dimensional vector representation and the similarity score by operating an Artificial intelligence (AI) driven Query Aggregator (AIQA) module to yield one or more clusters of customer queries with semantic similarity; (iv) matching each cluster of customer queries with the response based on a preconfigured threshold by operating a Cosine Vector Search Engine (CVSE); (v) automatically generating a notification for each customer query based on the matched response by operating a notification module; and (vi) automatically sending the notification to each customer that is associated with the customer query.

Furthermore, in accordance with some embodiments of the present disclosure, the operating of the semantic embedder module may include: (i) receiving the customer query; (ii) preprocessing the customer query; (iii) classifying the customer query as one of: structured and unstructured; (iv) converting text of the customer query that was classified as unstructured into semantic embedding by using an Artificial Intelligence (AI) model; (v) mapping the customer query that was classified as structured to the semantic embedding; (vi) creating the high-dimensional vector representation of the customer query based on the semantic embedding, and storing is in an embedding database. The high-dimensional vector representation comprising a meaning and context of the customer query, and (vii) comparing the created high-dimensional vector representation of the customer query to high-dimensional vector representations of customer queries stored in the embeddings database to calculate a similarity score for each customer query in the embedding database.

Furthermore, in accordance with some embodiments of the present disclosure, the preprocessing may include tokenizing the customer query; (ii) removing stop words; and (iii) operating lemmatization to the customer query.

Furthermore, in accordance with some embodiments of the present disclosure, the calculating of the similarity score for each customer query may be performed according to formula (I)

$$\text{similarity score } (v_i, v_j) = v_i * v_j / \|v_i\| \|v_j\| \tag{I}$$

whereby:
$v_i$ is the semantic embedding of the received customer query, and
$v_j$ is the semantic embedding of the customer query stored in the embedding database.

Furthermore, in accordance with some embodiments of the present disclosure, the operating of the AIQA module may include: (i) retrieving a preconfigured similarity-threshold; (ii) clustering each high-dimensional vector representation of the customer query to a cluster based on the preconfigured similarity-threshold and a related cluster centroid; (iii) creating a new cluster when no cluster has been found; and (iv) updating the related centroid of the cluster after the clustering of the high-dimensional vector representation.

Furthermore, in accordance with some embodiments of the present disclosure, the semantic embedder module may use sentence-level contextual embedding techniques.

Furthermore, in accordance with some embodiments of the present disclosure, the operating of the CVSE may include for each cluster of customer queries with semantic similarity: (i) extracting phrases from the customer queries by using keyword extractions; (ii) identifying an intent of the customer queries in the cluster by mapping the extracted phrases to predefined intents by operating one of: intent classification models and a lookup table; (iii) fetching a corresponding response template based on the identified intent from a predefined library; and (iv) performing a quality check from the corresponding response template by checking that the response template matches the identified intent and includes dynamic placeholder values.

Furthermore, in accordance with some embodiments of the present disclosure, the computerized-method may further include routing queries that were not matched with the response to a human agent for a manual intervention.

Furthermore, in accordance with some embodiments of the present disclosure, the computerized-method may further include operating a feedback loop that continuously learns from customer interactions and agent corrections and improve clustering and intent identification accuracy.

There is further provided, in accordance with some embodiments of the present invention, a computerized-system for matching customer queries across diverse digital channels with a response in a multichannel contact center.

Furthermore, in accordance with some embodiments of the present disclosure, the computerized-system may include one or more processors. The one or more processors may be configured to: (i) continuously receive queries from customers via one or more types of digital communication channels; in each preconfigured time-window: (ii) convert each customer query in the received queries into a high-dimensional vector representation and scoring the customer query to yield a similarity score by operating a semantic embedder module; (iii) cluster each customer query based on the similarity score by operating an Artificial intelligence (AI) driven Query Aggregator (AIQA) module to yield one or more clusters of customer queries with semantic similarity; (iv) match each cluster of customer queries with the response based on a preconfigured threshold by operating a Cosine Vector Search Engine (CVSE); (v) automatically generate a notification for each customer query based on the matched response by operating a notification module; and (vi) automatically send the notification to each customer that is associated with the customer query.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

FIGS. 2A-2B schematically illustrate a high-level diagram of a computerized-method for matching customer queries across diverse digital channels with a response in a multichannel contact center, in accordance with some embodiments of the present invention;

DETAILED DESCRIPTION

Figure 1:
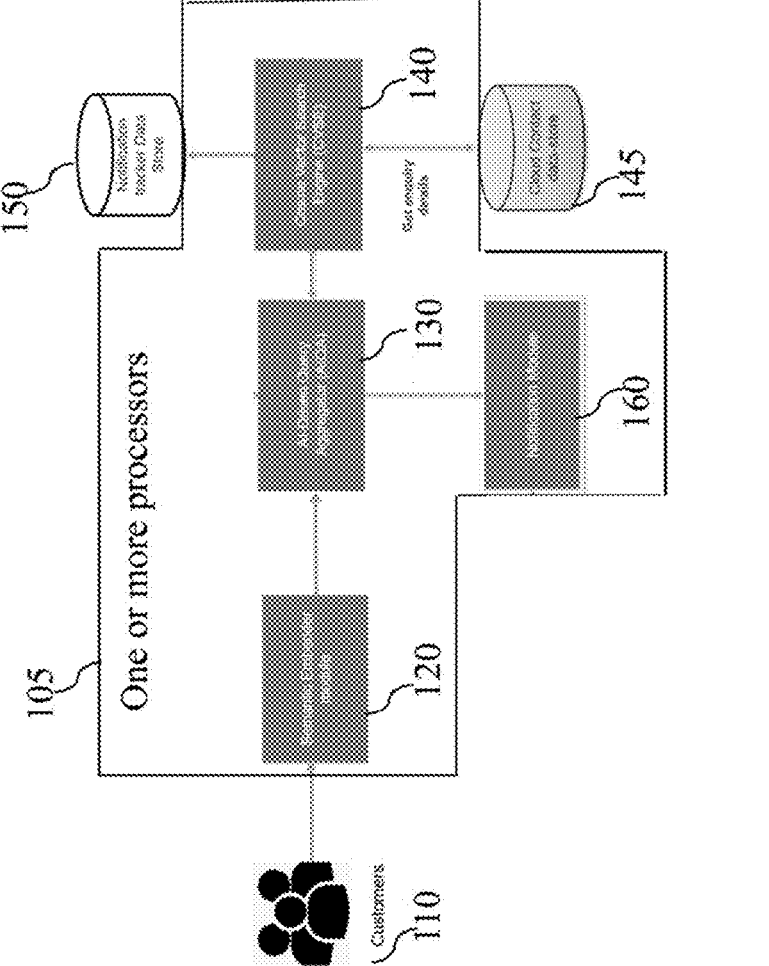
FIG. 1 schematically illustrates a high-level diagram of a computerized-system for matching customer queries across diverse digital channels with a response in a multichannel contact center, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Currently there is no technical solution that provides an analysis and matching of customer queries across various types of digital communication channels in multichannel contact centers with Generative AI. Customer queries across digital channels at current times lack standardization, hence, hard to analyze and match to a response. Current systems fail to efficiently identify similar queries, which leads to operational bottlenecks.

A recent survey by callcenter.co.uk showed 82% of call centers said that employee morale had increased since implementing a multichannel solution and nearly 100% said it was easier to attract and retain agents in a 'more varied' role.

Whilst 'voice' might still be representing majority of contact-methods, research shows that the percentage of customer interactions has dropped from 90.1%, down to 73.2% between 2006 and 2013. Meanwhile, other channels are rising, such as email, webchat and social media. Once a multichannel platform is in place, solving customer queries can be far lower cost. For instance, a webchat session is on average 40% lower cost than a phone call.

Optimizing multichannel support may increase customer satisfaction and reduce wait times and a low abandonment rate. Net Promoter Score (NPS) will show a marked improvement which is a popular metric used to measure customer loyalty and satisfaction. For a contact center, an average NPS growth of 7% correlates with a 1% growth in revenue.

Poor customer service is costing businesses more than $75 billion a year, according to a report from New Voice-Media. Just a five percent improvement in customer retention can boost a company's profitability by as much as 75 percent, according to Bain & Company.

Therefore, there is a need for a technical solution for matching customer queries across diverse digital channels with a response in a multichannel contact center, in a contact center based on QoS measurements.

FIG. 1 schematically illustrates a high-level diagram of a computerized-system 100 for matching customer queries across diverse digital channels with a response in a multi-channel contact center, in accordance with some embodiments of the present invention.

According to some embodiments of the present disclosure, a system, such as computerized-system 100 one or more processors 105 may be configured to continuously receive queries from customers via various types of digital communication channels, such as email, web chat social media and subscribed voice etc.

According to some embodiments of the present disclosure, in each preconfigured time-window, e.g., every five minute, the one or more processors 105 may operate a semantic embedder module 120 to convert each customer query in the received queries into a high-dimensional vector representation and score the customer query to yield a similarity score.

According to some embodiments of the present disclosure, a high-dimensional vector is a mathematical representation of data used in machine learning. Each dimension of the vector corresponds to a specific feature or aspect of the data. For example, a word or a text of a few sentences might be represented as a high-dimensional vector where each dimension captures a specific meaning or context. The high-dimensional vector helps machines understand and compare text based on content, not just raw pixels.

According to some embodiments of the present disclosure, embedding techniques are key components of Natural Language Processing (NLP) and machine learning, since information, such as words and sentences, may be represented in a numerical form that a model can process.

According to some embodiments of the present disclosure, computerized-system 100 may use generative Artificial Intelligence (AI) to analyze and match customer queries seamlessly across various digital channels within multichannel contact centers. By utilizing advanced generative AI techniques, the computerized-system 100 may enhance query understanding, semantic similarity assessment, and matching accuracy, thereby improving customer service efficiency and satisfaction.

According to some embodiments of the present disclosure, the computerized-system 100 may use generative AI models, such as Transformer-based architectures, like Generative Pre-trained Transformer (GPT), to embed customer queries into high-dimensional semantic vector representations, capturing their contextual meanings.

According to some embodiments of the present disclosure, the computerized-system 100 may analyze and match customer queries based on similarity by having the one or more processors 105 configured to operate the Artificial intelligence (AI) driven Query Aggregator (AIQA) module 130 cluster each customer query based on the similarity score and yield one or more clusters of customer queries with semantic similarity.

According to some embodiments of the present disclosure, the AIQA module 130 may retrieve a preconfigured similarity threshold and then cluster each high-dimensional vector representation of the customer query to a cluster based on the preconfigured similarity-threshold and a related cluster centroid. A new cluster may be created when no cluster has been found. The related cluster centroid may be updated after the clustering of the high-dimensional vector representation has been associated to the cluster.

According to some embodiments of the present disclosure, the computerized-system 100 may cluster similar queries, enabling streamlined response generation for high-frequency issues. This reduces agent workload, boosts response times, and enhances customer satisfaction. These elements collectively provide a robust, adaptive, and secure solution for real-time query handling in multichannel environments, enhancing customer service efficiency and satisfaction.

According to some embodiments of the present disclosure, the computerized-system 100 may operate a Cosine Vector Search Engine (CVSE) 140 to match each cluster of customer queries with the response based on a preconfigured threshold.

According to some embodiments of the present disclosure, the computerized-system 100 may incorporate a dynamic adjustment mechanism for similarity thresholds, allowing for real-time adaptation based on system performance, ensuring optimal matching accuracy of a response.

According to some embodiments of the present disclosure, the computerized-system 100 may generate customized responses or recommendations based on customer preferences and historical interactions. It may anticipate customer needs by proactively addressing common queries or suggesting relevant content.

According to some embodiments of the present disclosure, the computerized-system 100 may preprocess raw customer queries from diverse digital channels and convert them into a standardized format. Using generative AI, it may embed these queries into semantic vector representations, ensuring consistent understanding of query context and meaning.

According to some embodiments of the present disclosure, by the operation of the CVSE 140 and the calculating of the cosine similarity between the semantic embeddings of queries, the computerized-system 100 may assess the similarity between queries. A predefined similarity threshold (theta) determines whether two queries are considered a match, ensuring accurate an efficient query matching.

According to some embodiments of the present disclosure, for each cluster of customer queries with semantic similarity the CVSE 140 may extract phrases from the customer query by using keyword extractions and then identify an intent of the customer queries in the cluster by mapping the extracted phrases to predefined intents by operating one of: intent classification models and a lookup table.

According to some embodiments of the present disclosure, the CVSE 140 may fetch a corresponding response template based on the identified intent from a predefined library and perform a quality check from the corresponding response template by checking that the response template matches the identified intent and includes dynamic placeholder values.

According to some embodiments of the present disclosure, the computerized-system 100 may dynamically adjust the similarity threshold (theta) based on real-time performance metrics. This adaptive approach ensures that the matching process remains efficient and accurate under varying conditions.

According to some embodiments of the present disclosure, by employing cosine similarity on semantic embeddings, the system accurately assesses query similarity. A dynamically adjustable threshold (θ\theta θ) fine-tunes matching precision based on real-time performance, optimizing both accuracy and efficiency.

According to some embodiments of the present disclosure, the computerized-system 100 may leverage a robust generative AI model trained on a wide range of query variations, allowing it to generalize well to new or complex query types. This approach enables the system to accurately interpret unique phrasing, slang, and colloquial language across channels, ensuring effective matching even for unfamiliar or evolving language patterns.

According to some embodiments of the present disclosure, by accurately matching similar queries across channels, the system reduces response times and improves the efficiency of query resolution, leading to enhanced customer satisfaction.

According to some embodiments of the present disclosure, efficient query matching may optimize agent workloads, reducing redundant efforts and improving overall productivity. Thus, the computerized-system 100 may provide a more accurate view of contact center load, enabling better resource allocation and service planning.

According to some embodiments of the present disclosure, the computerized-100 may address the challenges of query variability and semantic differences in multichannel contact centers, ensuring a seamless and efficient customer service experience.

According to some embodiments of the present disclosure, the computerized-100 may implement a method, such as computerized-method 200 in FIG. 2 for matching customer queries across diverse digital channels with a response in a multichannel contact center.

According to some embodiments of the present disclosure, a customer 110 may submit queries to the contact center via digital channels such as chat, email, or social media. These queries may initiate the process of computerized-system 100 for matching customer queries across diverse digital channels with a response in a multichannel contact center.

According to some embodiments of the present disclosure, the incoming queries may be preprocessed and converted into a high-dimensional vector representation by using AI-based embedding techniques for semantic consistency, to enable the system to understand the context and meaning of the queries.

According to some embodiments of the present disclosure, the customer query may be a raw input from various digital channels such as email, chat, voice, social media. Each query may be preprocessed by tokenizing it and then removing stop words and operating lemmatization to the customer query.

According to some embodiments of the present disclosure, normalizing the query by removing noise e.g., stop words, special characters, and the like. The semantic embedder module 120 may determine if the query is structured or unstructured before converting the text of the query into semantic embedding by using an AI model and creating the high-dimensional vector representation of the customer query based on the semantic embedding.

According to some embodiments of the present disclosure, the queries may be classified as structured queries and unstructured queries. The classification may be based on predefined or standard formats, e.g., tracking number of a package for structured queries and free text may be considered unstructured. The free text may be converted into semantic embeddings using an AI-based model e.g., GPT, Bidirectional Encoder Representations from Transformers (BERT) which is a sentence-level contextual embedding technique. The semantic embedding may capture both semantic meaning and contextual relevance.

According to some embodiments of the present disclosure, the semantic embedder 120 may compare the created high-dimensional vector representation of the customer query to high-dimensional vector representations of customer queries stored in the embeddings database to calculate a similarity score for each customer query in the embedding database. The high-dimensional vector representation and the similarity score may be forwarded to subsequent modules like AIQA 130 and CVSE 140 for further processing.

According to some embodiments of the present disclosure, the calculating of the similarity score for each customer query may be performed according to formula (I)

$$\text{similarity score } (v_i, v_j) = v_i * v_j / \|v_i\| \|v_j\| \tag{I}$$

whereby:
$v_i$ is the semantic embedding of the received customer query, and
$v_j$ is the semantic embedding of the customer query stored in the embedding database.

According to some embodiments of the present disclosure, notification tracker data store 150 may log notification details, query history, and status updates for further reporting and tracking purposes. The cloud contact data store 145 may be a cloud-based system that stores and manages contact-related data, such as customer names, phone numbers, email addresses, interaction history, preferences, and more for use in applications such as call centers, customer support platforms, or Customer Relationship Management (CRM) systems.

Figure 13A:
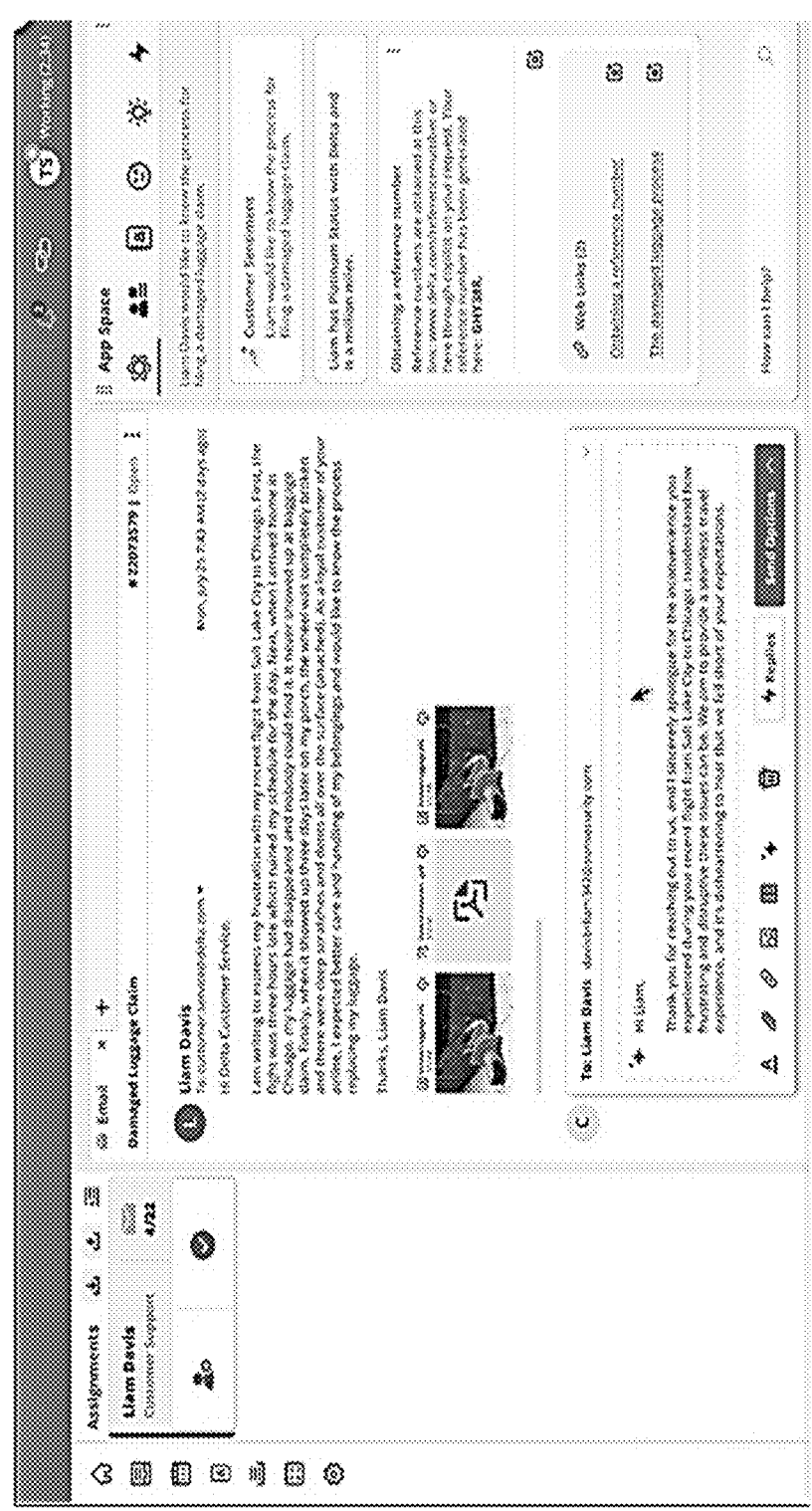
FIG. 13A is a screenshot of a matched response to a query, in accordance with some embodiments of the present invention.

According to some embodiments of the present disclosure, a notification module 160 may be operated to generate a notification for each customer query based on the matched response for example, as shown in FIG. 13A, and the response to the customer query may be sent to the customer.

According to some embodiments of the present disclosure, optionally, the computerized-system 100 may further route queries that were not matched with the response to a human agent for a manual intervention.

According to some embodiments of the present disclosure, optionally, the computerized-system 100 may further operate a feedback loop module that may continuously learn from customer interactions and agent corrections and improve clustering and intent identification accuracy. The feedback loop may collect feedback from resolved queries to improve future system performance.

Figure 2B:
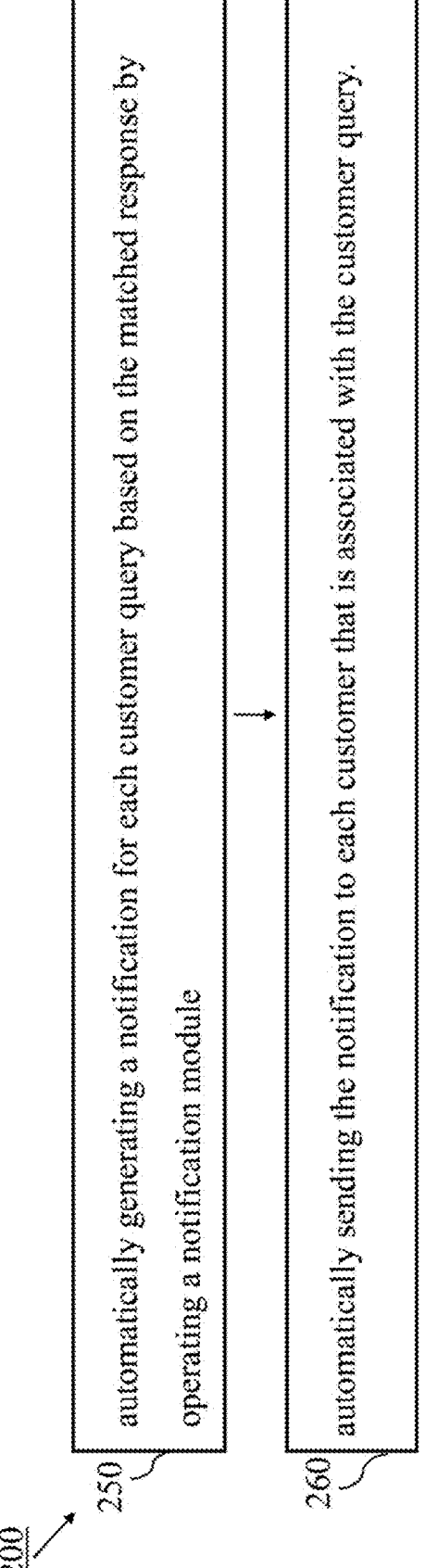

FIGS. 2A-2B schematically illustrate a high-level diagram of a computerized-method 200 for matching customer queries across diverse digital channels with a response in a multichannel contact center, in accordance with some embodiments of the present invention.

According to some embodiments of the present disclosure, operation 210 comprising continuously receiving queries from customers via one or more types of digital communication channels.

According to some embodiments of the present disclosure, in each preconfigured time-window performing operations 220-260.

According to some embodiments of the present disclosure, operation 220 comprising converting each customer query in the received queries into a high-dimensional vector representation and scoring the customer query to yield a similarity score by operating a semantic embedder module.

According to some embodiments of the present disclosure, operation 230 comprising clustering each customer query based on the high-dimensional vector representation and the similarity score by operating an Artificial intelligence (AI) driven Query Aggregator (AIQA) module to yield one or more clusters of customer queries with semantic similarity.

According to some embodiments of the present disclosure, operation 240 comprising matching each cluster of customer queries with the response based on a preconfigured threshold by operating a Cosine Vector Search Engine (CVSE).

According to some embodiments of the present disclosure, operation 250 comprising automatically generating a notification for each customer query based on the matched response by operating a notification module.

According to some embodiments of the present disclosure, operation 260 comprising automatically sending the notification to each customer that is associated with the customer query.

Figure 3:
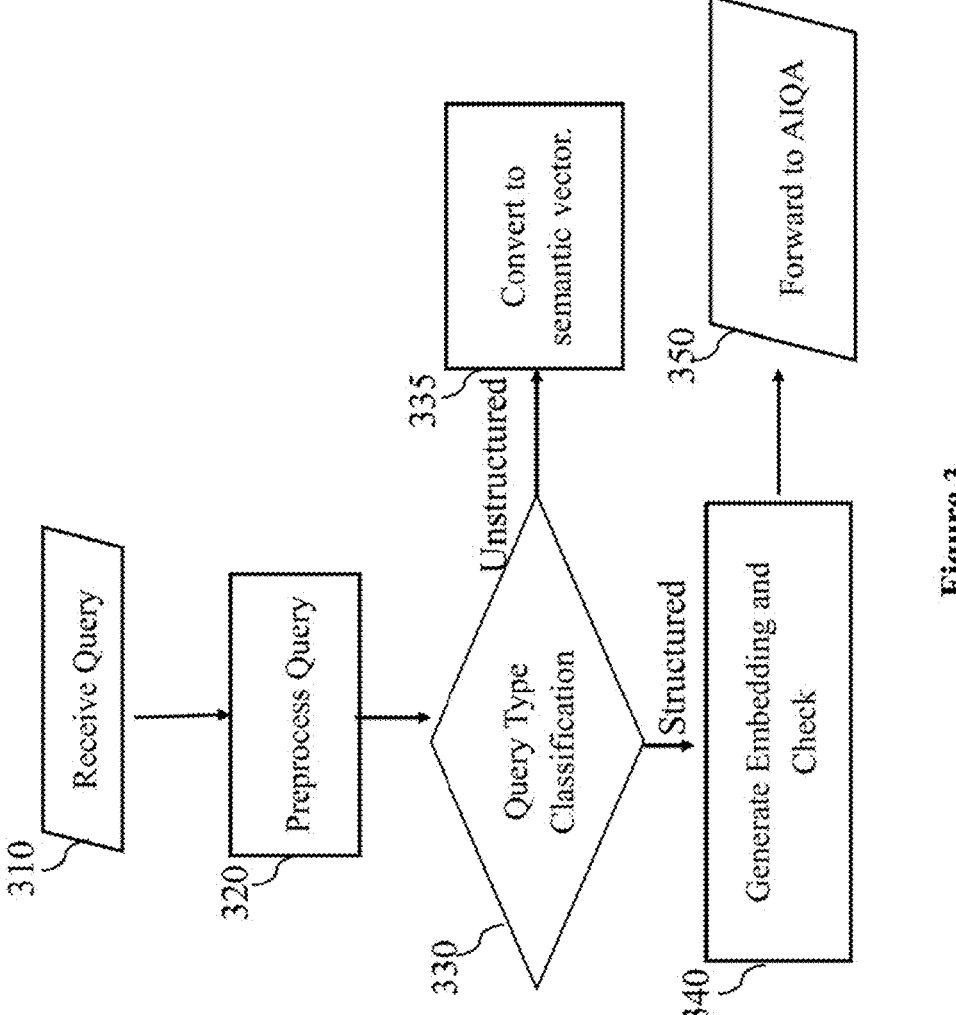
FIG. 3 schematically illustrates a high-level flowchart of a semantic embedder module, in accordance with some embodiments of the present invention.
Figure 3:

FIG. 3 schematically illustrates a high-level flowchart of a semantic embedder module 300, in accordance with some embodiments of the present invention.

According to some embodiments of the present disclosure, the semantic embedder module 120 in FIG. 1 may be implemented as the semantic embedder module 300. The semantic embedder module 300 may receive the query 310 and then preprocess the query 320. The processed query cleaned and tokenized may be classified 330 as one of: structured and unstructured. The text of the customer query which has been classified as unstructured may be converted into semantic vector 335 embedding by using an Artificial Intelligence (AI) model such as Foundation Model Pre-Training FPT to train large models such as BERT on massive datasets before fine-tuning them for specific tasks. The FPT refers to the initial training phase where the model learns general language understanding.

According to some embodiments of the present disclosure, the AI model may generate a high-dimensional semantic vector representation of the data in the customer query. The AI model may capture the contextual meaning of the query, enabling the system to understand intent, meaning, and nuances.

According to some embodiments of the present disclosure, the generated vector embeddings may be mathematically represented as the high-dimensional semantic vector representation, where each dimension represents specific contextual information of the query. For example, for a query such as "What is the status of my order?", the vector embedding may contain components reflecting order status, customer service, and possibly time-based context.

According to some embodiments of the present disclosure, the vector embedding generation may take from a few milliseconds to a second, depending on the complexity and size of the AI model used.

According to some embodiments of the present disclosure, when the type of the query is structured, e.g., tracking number, the semantic embedder module may generate embedding and check 340 semantic consistencies, enabling the system to better understand the context and meaning of the customer queries.

Figure 4:
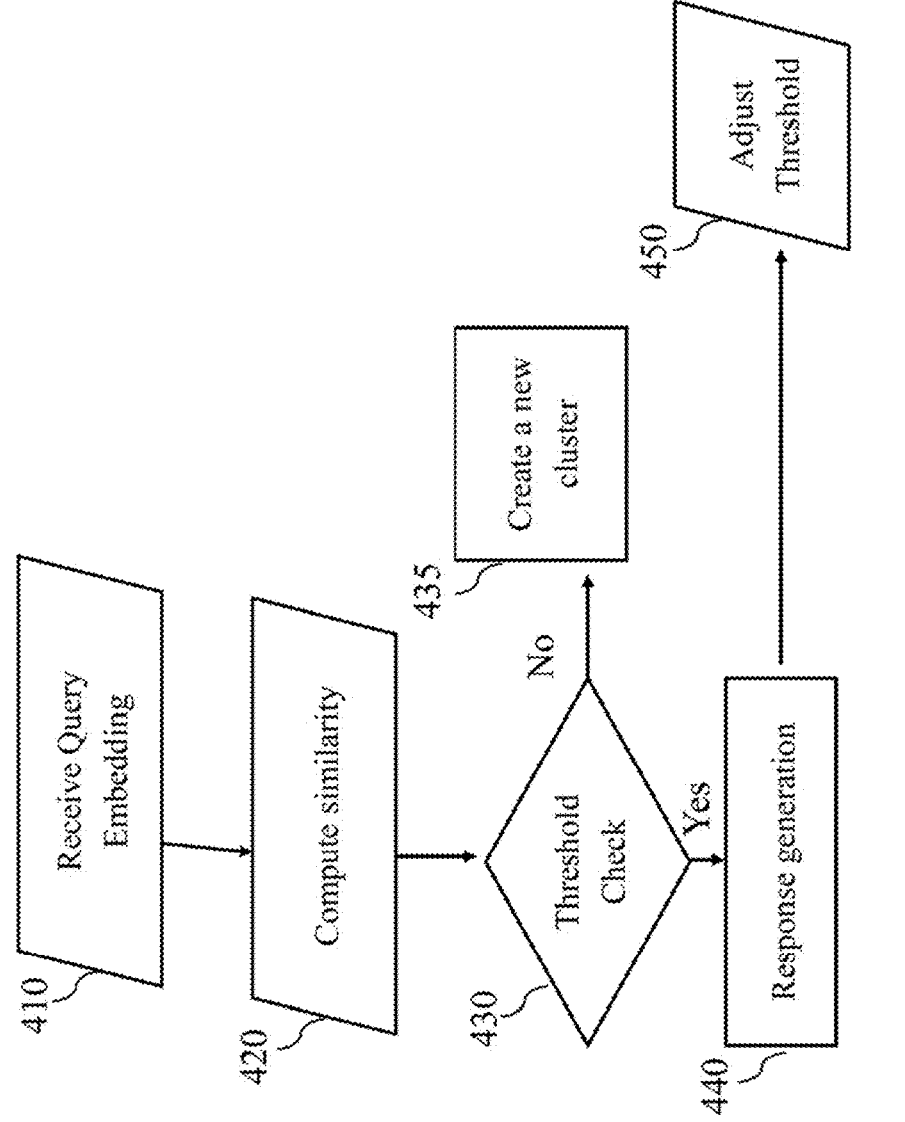
FIG. 4 schematically illustrates a high-level flowchart of AI-driven Query Aggregator module, in accordance with some embodiments of the present invention.

According to some embodiments of the present disclosure, the vector embedding may be forwarded to the AIQA module, such as AIQA module 130 in FIG. 1, and such as AIQA module 400 in FIG. 4.

FIG. 4 schematically illustrates a high-level flowchart 400 of AI-driven Query Aggregator module (AIQA) 400, in accordance with some embodiments of the present invention.

According to some embodiments of the present disclosure, in a computerized-system, such as computerized-system 100 in FIG. 1, queries may be grouped and aggregated based on their semantic similarity, leveraging advanced AI models. The AIQA may reduce redundancy by identifying and clustering similar queries.

According to some embodiments of the present disclosure, the AIQA module 400 may receive query embeddings 410 which are embedding vectors generated from the semantic embedder module 300 in FIG. 3. The AIQA module 400 may use historical query data of previous queries and their outcomes to aggregate similar queries into clusters.

According to some embodiments of the present disclosure, the queries may be grouped based on semantic similarity. The AIQA module may dynamically adjust the similarity threshold $\theta$ based on real-time performance and system load. Aggregated clusters allow for faster response generation and reduced redundancy in handling.

According to some embodiments of the present disclosure, the similarity may be computed 420 by comparing the new query embeddings vector with historical clusters of queries.

According to some embodiments of the present disclosure, threshold check 430 may be operated. If the similarity score exceeds a predefined threshold ($\theta$), the query may be added to the existing cluster. If no match is found within existing clusters, create a new cluster 435.

According to some embodiments of the present disclosure, a response may be generated 440 for clustered queries, at the end of each time window. If the query is unique or requires a more detailed answer, it may be routed to an agent for resolution.

According to some embodiments of the present disclosure, based on the clustering and resolution, the similarity threshold may be adjusted dynamically for improved performance 450. A predefined or AI-generated response may be matched for clustered queries. Queries that are unique or not properly matched may require human intervention. Adjusted thresholds may be used for future clustering based on real-time performance.

According to some embodiments of the present disclosure, feedback may be received from customers about how their past queries were handled to improve service quality, agent performance, and customer satisfaction. The feedback may be collected in one of the following ways or a combination thereof. Post-interaction surveys, right after the query is resolved. Follow-Up emails by sending an email a few hours or days after resolution, asking the customer to rate the service or leave a comment. Agent-based feedback collection by having agents ask directly at the end of a call or chat. Feedback portals or dashboards may be operated for ongoing or high-value clients. The customer portal may be provided for submitting feedback, and the resolution history is visible. AI-Driven sentiment Analysis which is a passive for of feedback. NLP models may be used to analyze customer sentiment from call transcripts or chat logs. Even if a customer doesn't leave feedback, the tone of their messages or voice may indicate satisfaction or frustration.

Figure 5:
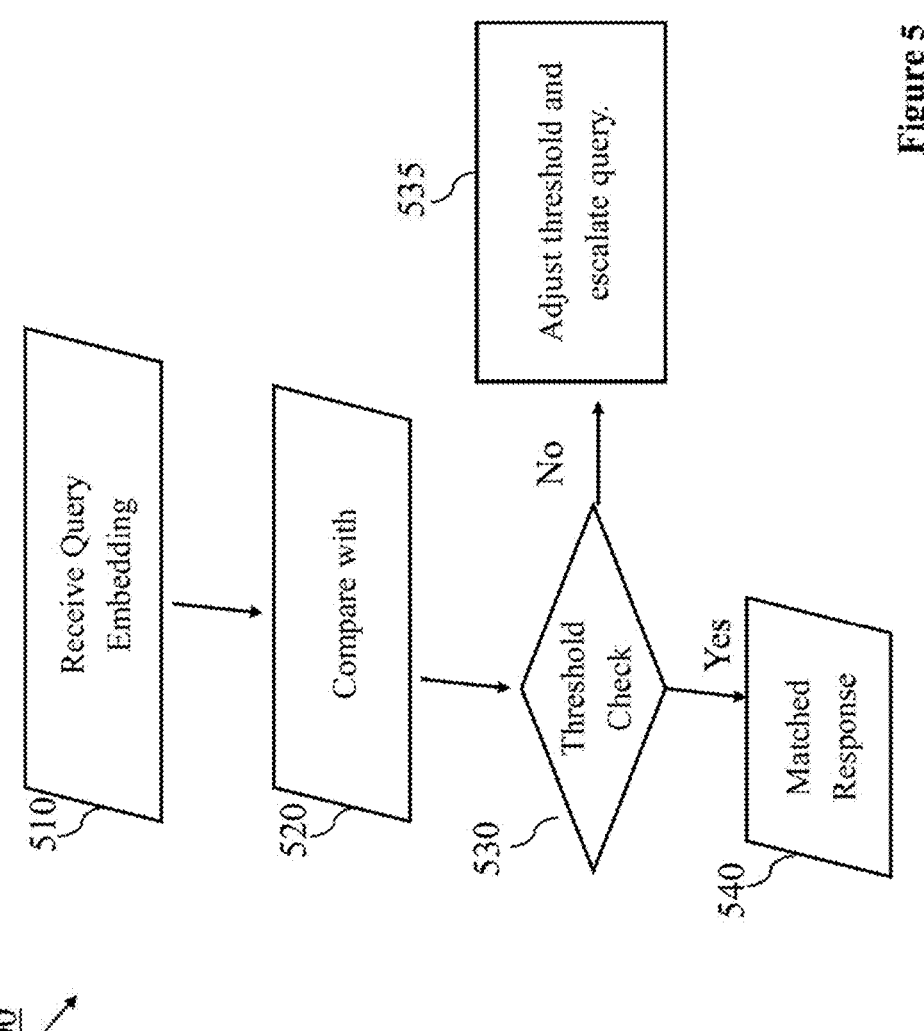
FIG. 5 schematically illustrates a high-level flowchart of a Cosine Vector Search Engine module, in accordance with some embodiments of the present invention.

FIG. 5 schematically illustrates a high-level flowchart 500 of a Cosine Vector Search Engine 500, in accordance with some embodiments of the present invention.

According to some embodiments of the present disclosure, the CVSE 500, such as CVSE 140 in FIG. 1 may handle the query matching process by computing cosine similarity between query vectors. It may match queries against stored patterns or historical query data in the cloud contact data-store. The CVSE may retrieve relevant details to respond to customer queries effectively.

According to some embodiments of the present disclosure, the query embedding vector may be received 510 and compared with 520 stored query embeddings, historical or previously processed queries in the database, such as embeddings database, cloud contact data-store 145 in FIG. 1.

According to some embodiments of the present disclosure, the cloud contact center data store may include a variety of data types to support customer service operations, analytics, and personalization. For example, customer profile data such as name, contact info phone, email, and the like. Demographics or segmentation info, preferred language or communication channel. Interaction history as records of past interactions, such as voice calls, chats, emails, SMS, Social media interactions, Timestamps, duration, agent involved, transcripts or call recordings, resolution status e.g., resolved, escalated. Case/Ticket Data including Case ID, status e.g., open/closed/pending, Subject and description of the issue, assigned agent/team, tags or categories, e.g., billing, technical support, Service-Level Agreement (SLA) or priority level, Resolution notes. Feedback and satisfaction Data, such as Customer Satisfaction Score (CSAT), Net Promoter Score (NPS), Customer Effort Score (CES), Open-ended comments, Sentiment scores from surveys or AI analysis. Real-Time Contextual Data such as active session info, e.g., current browsing page if on web, chatbot or Interactive voice response (IVR) interaction before reaching agent, Device/browser info, Geolocation. Agent Performance Data such as the number of calls handled, Average Handle Time (AHT), First contact resolution rate. Customer feedback scores, QA evaluation scores. Knowledge base usage logs such as articles viewed or suggested during calls, chatbot or agent suggestions accessed, success rates of those suggestions.

According to some embodiments of the present disclosure, a cosine similarity may be computed between the query embedding vector and the stored embeddings. Based on the similarity score, operating threshold check 530 and queries may be either matched to existing patterns or sent to a human agent if the match score is below a threshold or if no match is found.

According to some embodiments of the present disclosure, the cosine similarity may be computed as:

$$\text{Cosine Similarity} = \|A\|\|B\|A \cdot B$$

whereby:

A and B are vectors such as word embeddings, sentence vectors, and the like, $A \cdot B$ is the product of the two vectors, $|A|$ and $|B|$ are the magnitudes or lengths of the vectors.

Cosine similarity measures how similar two vectors are in direction, and how aligned they are.

When Cosine Similarity equals '1' then the vectors point in the same direction, which means that the vectors are very similar.

When Cosine Similarity equals '0' then the vectors are orthogonal which means that there is no similarity between the vectors.

When Cosine Similarity equals '−1' then the vectors point in opposite directions which means that the vectors are completely different.

According to some embodiments of the present disclosure, the query is matched with a response 540 when the similarity score exceeds a threshold $\theta$\theta $\theta$. When the similarity score is below the threshold, the query may be escalated, and the threshold may be adjusted 535.

According to some embodiments of the present disclosure, the operation of the CVSE may involve real-time processing with the similarity calculation generally taking milliseconds.

Figure 6:
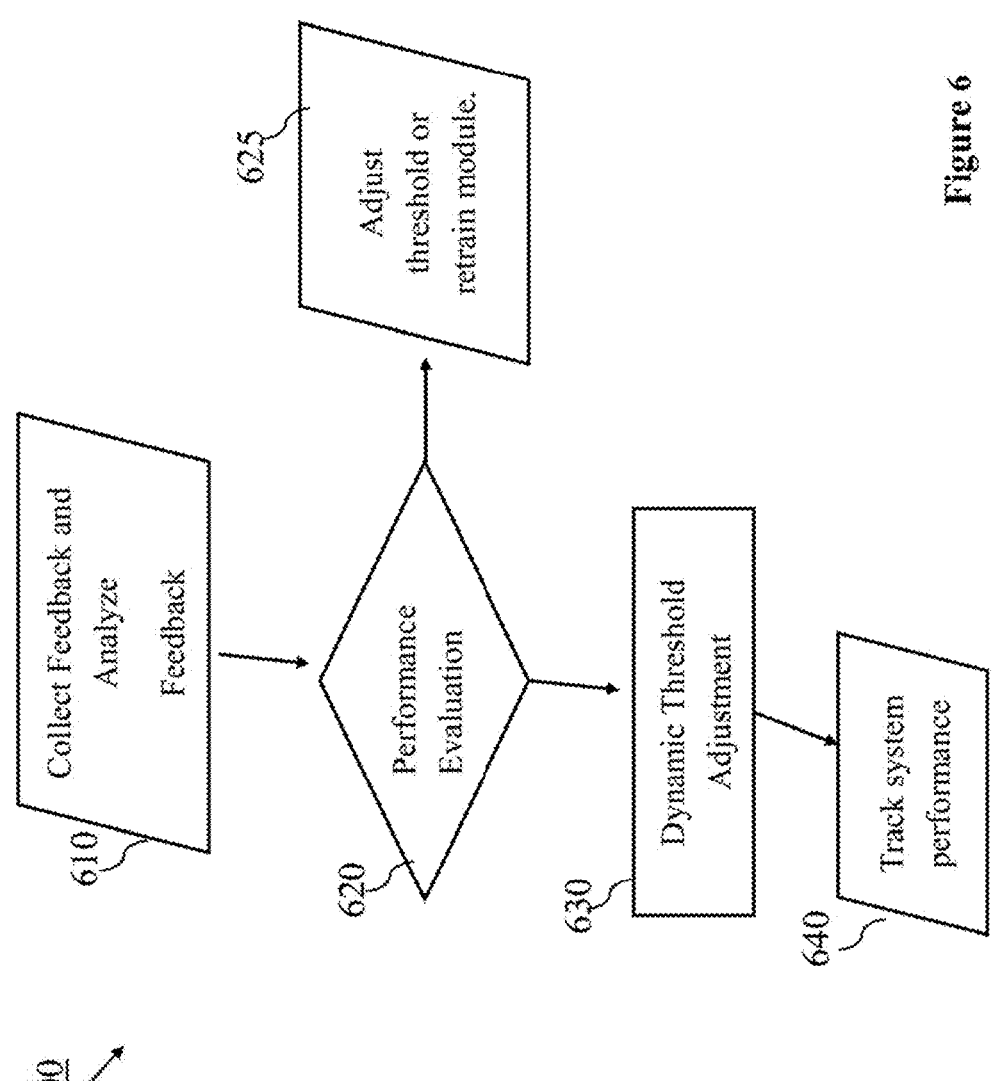
FIG. 6 schematically illustrates a high-level flowchart of a feedback loop module, in accordance with some embodiments of the present invention.

FIG. 6 schematically illustrates a high-level flowchart 600 of a feedback loop module, in accordance with some embodiments of the present invention.

According to some embodiments of the present disclosure, optionally, a computerized-system, such as system 100 may include a feedback loop module. The feedback loop module may collect feedback from resolved queries to improve future system performance.

According to some embodiments of the present disclosure, the feedback loop module may receive resolved customer queries, which are queries that have been resolved through AI or agent interaction. The feedback loop module may further receive customer feedback as to the query resolution, such as satisfaction ratings, comments or any other form of feedback provided by the customer. System performance metrics may be provided to the feedback module, such as system response time, matching accuracy, and query resolution time.

According to some embodiments of the present disclosure, the feedback module may collect feedback and analyze feedback 610. The feedback analysis may include sentiment analysis on customer feedback and performance evaluation 620 based on metrics and feedback. The feedback analysis may further include classification error detection by comparing AI-generated responses to actual customer feedback.

According to some embodiments of the present disclosure, the feedback analysis may adjust threshold or retrain the module 625. If performance is below expectations, adjust the query classification or similarity threshold. The retraining of the module, e.g., module update may depend on feedback, such that the module may be fine-tuned or retrained.

According to some embodiments of the present disclosure, the feedback module may track system performance 640 by continuously track system performance to ensure improvements.

According to some embodiments of the present disclosure, the thresholds may be adjusted by having new similarity thresholds for matching queries, depending on feedback and system performance.

According to some embodiments of the present disclosure, feedback reports may be generated. Logs and reports summarizing performance improvements and changes that were made.

According to some embodiments of the present disclosure, by accurately matching similar queries across channels, the system reduces response times and improves the efficiency of query resolution, leading to enhanced customer satisfaction. Efficient query matching helps optimize agent workloads, reducing redundant efforts and improving overall productivity. The system provides a more accurate view of contact center load, enabling better resource allocation and service planning.

Figure 7:
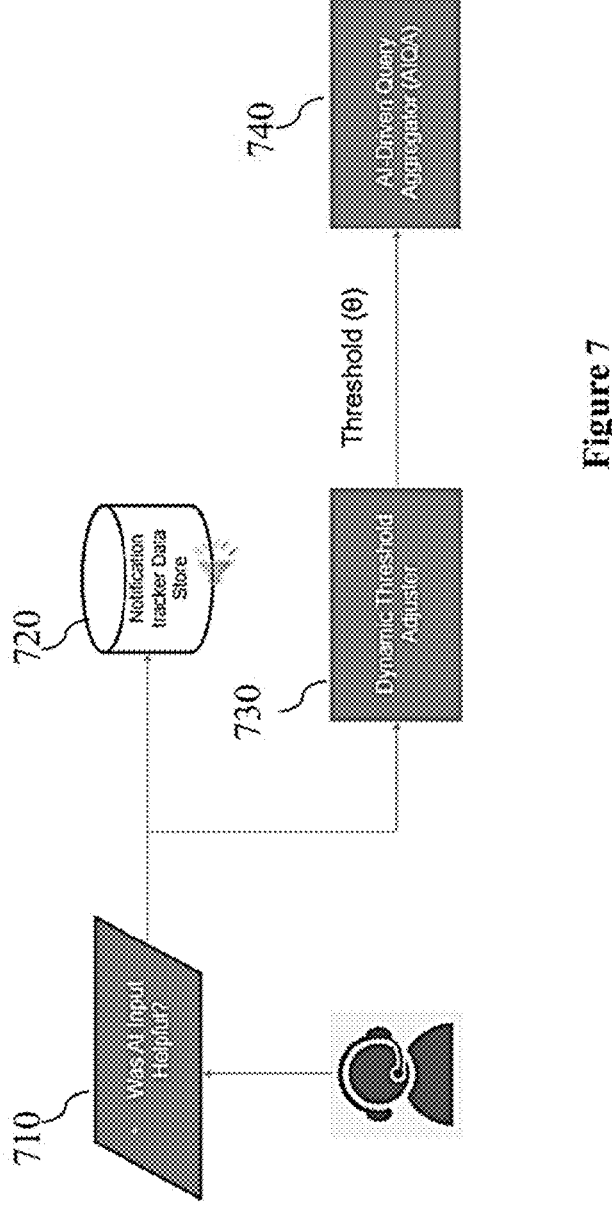
FIG. 7 schematically illustrates a high-level diagram of a feedback loop, in accordance with some embodiments of the present invention.

FIG. 7 schematically illustrates high-level diagram 700 of a feedback loop, in accordance with some embodiments of the present invention.

According to some embodiments of the present disclosure, in a system, such as computerized-system 100 in FIG. 1, data such as logs notification details, query history and status updates may be stored in a datastore, such as notification tracker datastore 720. The data may be stored for further reporting and tracking purposes.

According to some embodiments of the present disclosure, the queries may be grouped by a module, such as AIQA module 740, and such as AIQA module 130 in FIG. 1. The AIQA module 740 may group, and aggregate queries based on their semantic similarity, by leveraging AI models. This module reduces redundancy by identifying and clustering similar queries.

Figure 11:
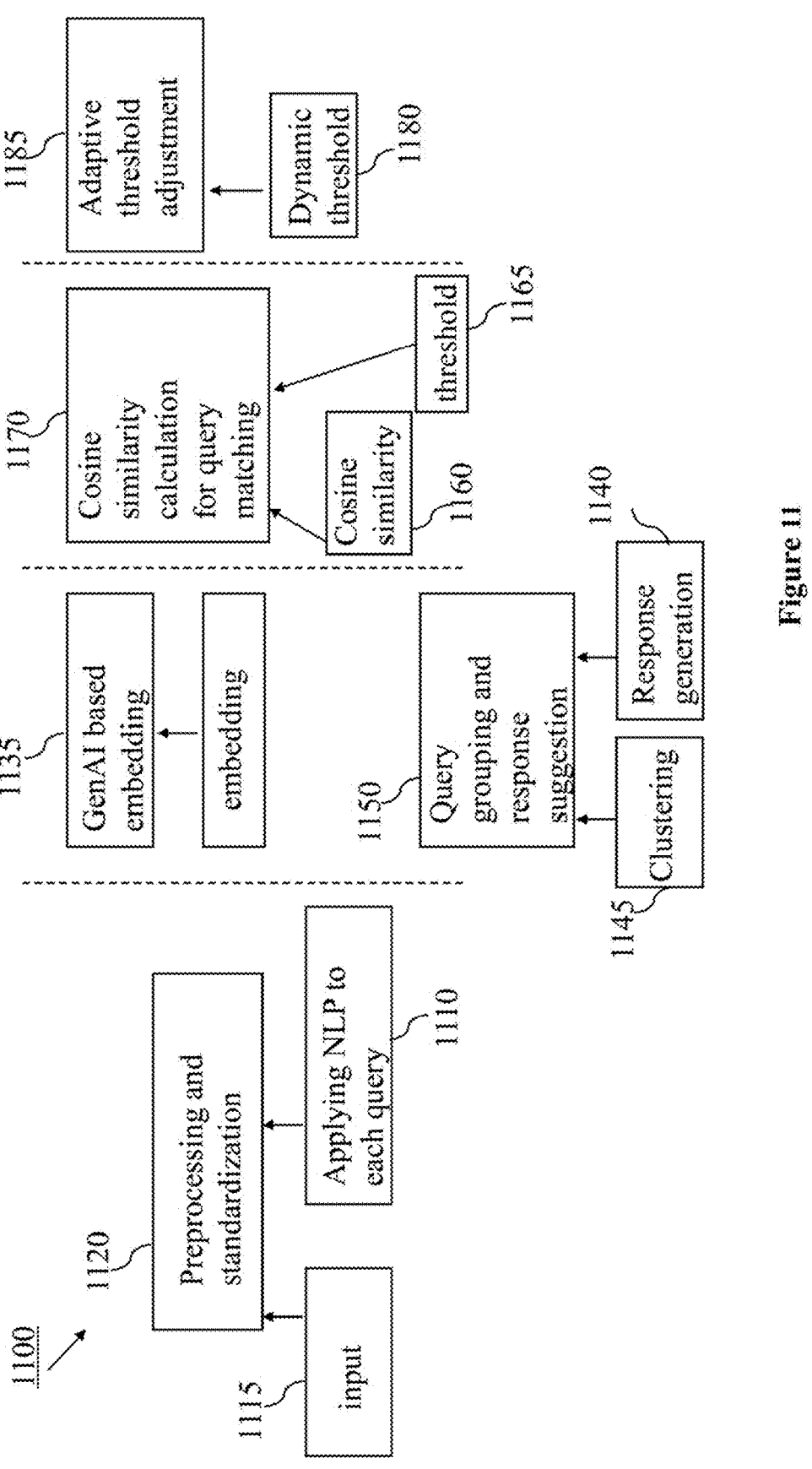
FIG. 11 schematically illustrates a process for matching customer queries across diverse digital channels with a response in a multichannel contact center, in accordance with some embodiments of the present invention.

According to some embodiments of the present disclosure, the dynamic threshold adjuster may be operated, as shown in FIG. 11.

Figure 8:
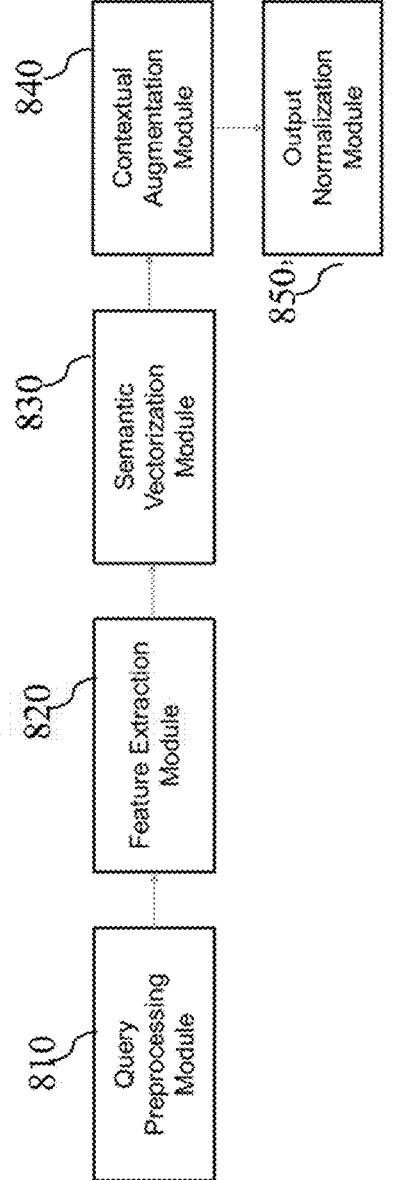
FIG. 8 schematically illustrates a high-level flowchart of a semantic embedder module, in accordance with some embodiments of the present invention.
Figure 8:

FIG. 8 schematically illustrates a high-level flowchart 800 of a semantic embedder module, in accordance with some embodiments of the present invention.

According to some embodiments of the present disclosure, system, such as computerized-system 100 in FIG. 1 may operate a module, such as the semantic embedder module 120 in FIG. 1. The semantic embedder module may operate a query preprocessing module 810 to prepare and standardize raw customer queries for embedding by removing noise. Essential linguistic and contextual features of the query may be identified by a feature extraction module 820.

According to some embodiments of the present disclosure, the preprocessed queries may be converted into vector embeddings that capture their contextual meaning by a semantic vectorization module 830.

According to some embodiments of the present disclosure, the representation of the vector embeddings may be enhanced by incorporating historical and contextual data by a contextual augmentation module 840.

According to some embodiments of the present disclosure, an output normalization module 850 may ensure that the vector embeddings are consistent and ready for downstream processing.

Figure 9:
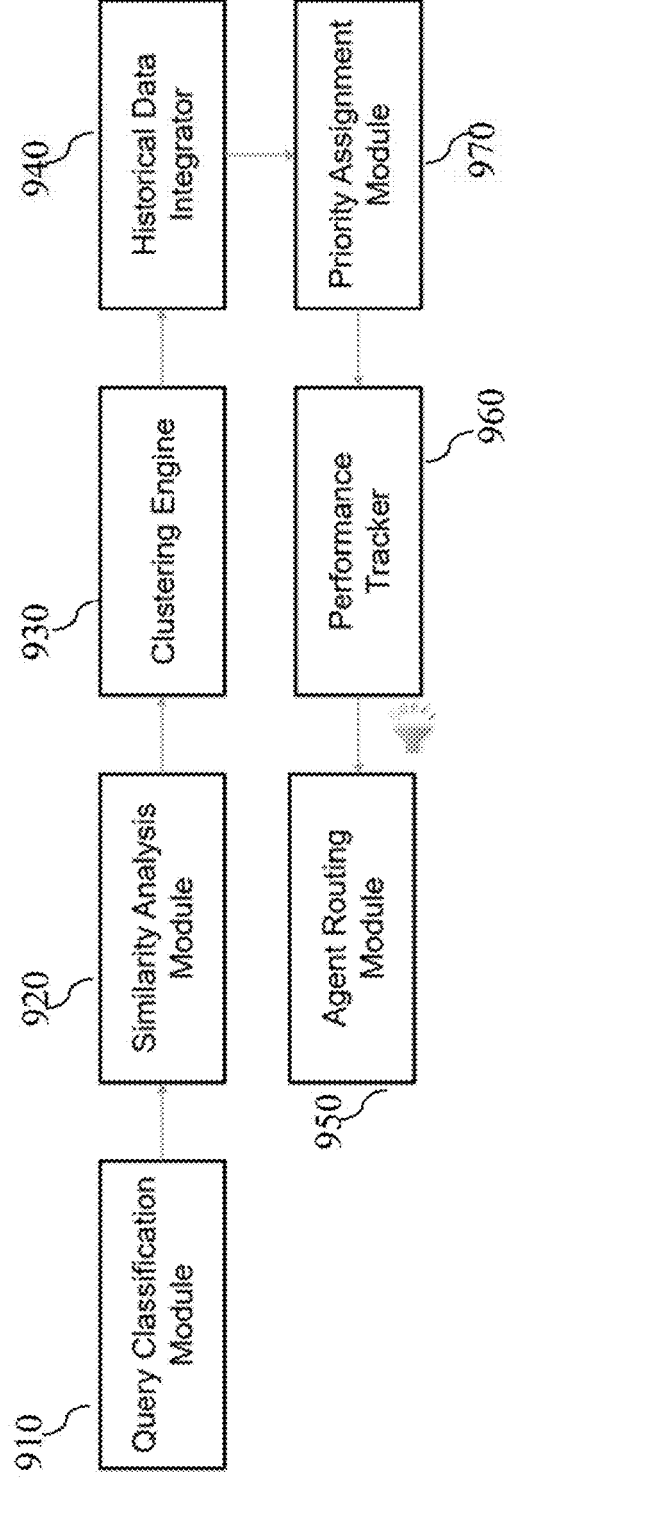
FIG. 9 schematically illustrates a high-level flowchart of an AI-driven Query Aggregator, in accordance with some embodiments of the present invention.

FIG. 9 schematically illustrates a high-level flowchart 900 of an AI-driven Query Aggregator (AIQA), in accordance with some embodiments of the present invention.

According to some embodiments of the present disclosure, a system, such as computerized-system 100 in FIG. 1, may operate a AIQA module 130 in FIG. 1. The AIQA module may operate a query classification module 910 which may categorize the incoming queries into predefined or dynamic categories based on intent and context.

According to some embodiments of the present disclosure, a similarity analysis module 920 may be operated to measure the semantic similarity between queries to identify related ones.

According to some embodiments of the present disclosure, a clustering engine 930 may be operated to group semantically similar queries into clusters for streamlined management.

According to some embodiments of the present disclosure, a historical data integrator 940 may incorporate historical query data for enriched query aggregation.

According to some embodiments of the present disclosure, a priority assignment module 950 may determine the priority of clustered queries to optimize resource allocation.

According to some embodiments of the present disclosure, a performance tracker 960 may operate the effectiveness of query aggregation and clustering.

According to some embodiments of the present disclosure, an agent routing module 970 may route unresolved or unique queries to human agents.

Figure 10:
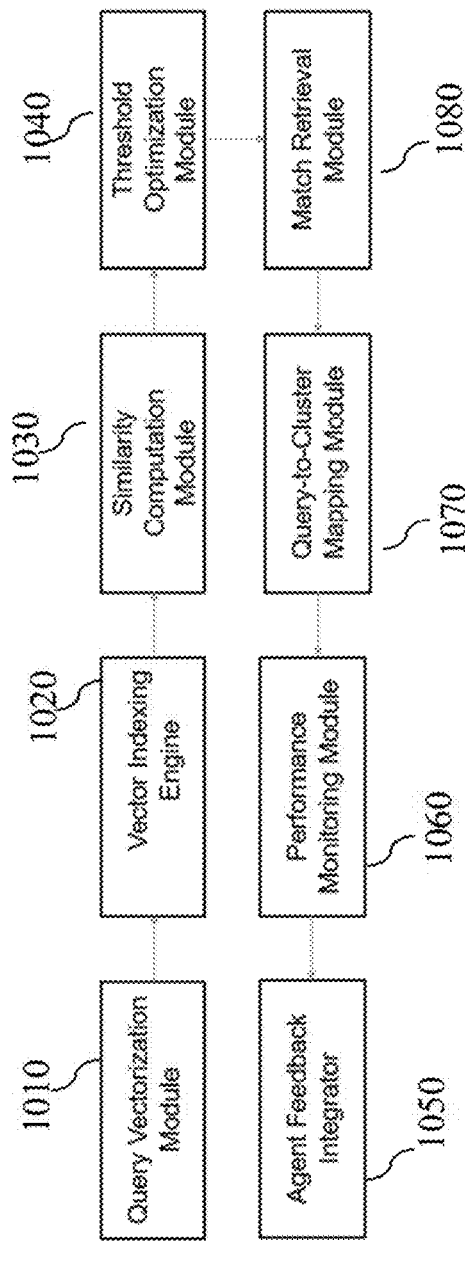
FIG. 10 schematically illustrates a high-level flowchart of a Cosine vector Search Engine, in accordance with some embodiments of the present invention.

FIG. 10 schematically illustrates a high-level flowchart 1000 of a Cosine vector Search Engine (CVSE), in accordance with some embodiments of the present invention.

According to some embodiments of the present disclosure, a computerized-system, such as computerized-system 100 in FIG. 1, may operate a module such as CVSE. The CVSE module may handle the query matching process by computing cosine similarity between query vectors. It may match queries against stored patterns or historical query data in the cloud contact data-store. The CVSE may retrieve relevant details to respond to customer queries effectively.

According to some embodiments of the present disclosure, a module such as query vectorization module 1010 may generate a query embedding vector. The query embedding vector may be the semantic embedding of the customer's query. The vector indexing engine 1020 may store embedding of previous customer queries or responses. The indexed knowledge base may be a database containing embeddings of previous customer queries or responses.

According to some embodiments of the present disclosure, the cosine similarity threshold (0) may be a predefined threshold that defines how similar a new query needs to be to an existing query.

According to some embodiments of the present disclosure, the similarity computation module 1030 may operate a query vector comparison by computing the cosine similarity between the query embedding and indexed query embedding.

According to some embodiments of the present disclosure, if the similarity score exceeds the threshold (0), retrieving the best matching response.

According to some embodiments of the present disclosure, the threshold optimization module 1040 may dynamically adjust the similarity threshold (0) to balance precision and recall.

According to some embodiments of the present disclosure, the match retrieval module 1050 may identify and retrieve matched queries and associated data.

According to some embodiments of the present disclosure, the query to cluster module 1060 may map the matched queries to their respective clusters for streamlined handling.

According to some embodiments of the present disclosure, the performance monitoring module 1070 may track and evaluate the efficiency of the vector search process.

According to some embodiments of the present disclosure, the agent feedback integrator may use the agent feedback to refine similarity matching and vector embeddings.

FIG. 11 schematically illustrates a process 1100 for matching customer queries across diverse digital channels with a response in a multichannel contact center, in accordance with some embodiments of the present invention.

According to some embodiments of the present disclosure, a system, such as computerized-system 100 in FIG. 1 may collect input 1115, such as incoming queries Q={q1, q2, . . . , qn} from multiple digital channels. Natural Language Processing (NLP) may be applied to each query including tokenization, stop-words and lowercasing for consistency of the query handling 1110.

$$q_i \rightarrow q_i^{standardized}$$

According to some embodiments of the present disclosure, a pretrained language model may be used to convert the $q_i^{standardized}$ into a vector embedding $v_i$ 1135 that captures the semantic meaning of the query.

$$V_i = \text{Embed}\left(q_i^{standardized}\right)$$

According to some embodiments of the present disclosure, a cosine similarity 1160 may be calculated for each pair of query embeddings ($v_i$, $v_j$).

$$\text{Cosine Similarity } (v_i, v_j) = v_i, *v_j / \|v_i\|\|v_j\|$$

According to some embodiments of the present disclosure, a similarity-threshold θ 1165 may be defined. When the cosine similarity between two queries exceeds θ, the queries may be considered a match. If cosine similarity ($v_i$, $v_j$)≥θ then $q_i$ and $q_j$ may be considered matched.

According to some embodiments of the present disclosure, an adaptive threshold adjustment 1185 may be implemented by real-time monitoring of performance metrics, such as response accuracy and query processing speed and then adjusting θ accordingly. For example, if matching accuracy needs improvement θ may be lowered to captured broader matches or increased to enhance precision. Θ←adjust threshold (θ, metrics). For example, Customer Support Chatbot The chatbot uses semantic matching to match user queries to FAQ answers using cosine similarity. A threshold θ is used to decide whether the match is good enough to show the answer.

According to some embodiments of the present disclosure, similar queries may be grouped into clusters based on cosine similarity scores to streamline response handling for high-volume or repetitive queries.

According to some embodiments of the present disclosure, semantically similar queries may be grouped into clusters 1145 to streamline handling and reduce redundancy. A module, such as Artificial intelligence (AI) driven Query Aggregator (AIQA) module may cluster each customer query based on the high-dimensional vector representation and the similarity score, to yield clusters of customer queries with semantic similarity.

According to some embodiments of the present disclosure, the AIQA module may receive vector representations of customer queries V={v1, v2, . . . , vn}, cosine similarity threshold θ 1165, e.g., θ=0.8 for grouping and optionally a maximum cluster size Smax to ensure cluster manageability.

According to some embodiments of the present disclosure, an empty list of clusters, C may be created and then iterating over the queries, for each query vector vi∈V: comparing with existing clusters by calculating cosine similarity sim(vi,cj) for each cluster centroid Cj in C and assigning vi to the cluster Ck where sim(vi,ck)≥θ and |Ck|<Smax, if such a cluster exists.

According to some embodiments of the present disclosure, creating a new cluster, when no suitable cluster is found which includes vi as its initial member.

According to some embodiments of the present disclosure, after adding vi to a cluster, updating the cluster centroid cj as the mean vector of all query vectors in the cluster.

According to some embodiments of the present disclosure, the AIQA module may yield a list of clusters C, where each cluster includes queries with a predetermined semantic similarity.

According to some embodiments of the present disclosure, a module, such as Cosine Vector Search Engine (CVSE) may be operated to match each cluster of customer queries which include queries with common intent, with a response based on the preconfigured threshold.

According to some embodiments of the present disclosure, the CVSE may receive clustered queries C={C1, C2, . . . , Cm}, predefined response templates mapped to common intents, for example, "order status" and "returns".

According to some embodiments of the present disclosure, optionally, a Machine Learning (ML) model may be trained to infer intent from cluster content of each cluster.

According to some embodiments of the present disclosure, the determining of the cluster intent may be operated by extracting representative terms or phrases from queries in Ck using keyword extraction. For example, Term Frequency-Inverse Document Frequency (TF-IDF), Bidirectional Encoder Representations from Transformers (BERT) embeddings.

According to some embodiments of the present disclosure, the extracted terms may be mapped to predefined intents using intent classification models or a lookup table.

According to some embodiments of the present disclosure, based on the identified intent the corresponding response template Tk may be fetched from a predefined library. For example, intent: order status→template: "your order is in transit. Check [tracking link]".

According to some embodiments of the present disclosure, optionally, the response may be validated by performing a quality check to ensure responses are relevant and accurate before finalizing.

According to some embodiments of the present disclosure, a standardized response Rk may be associated to each cluster ck 1140.

Figure 12:
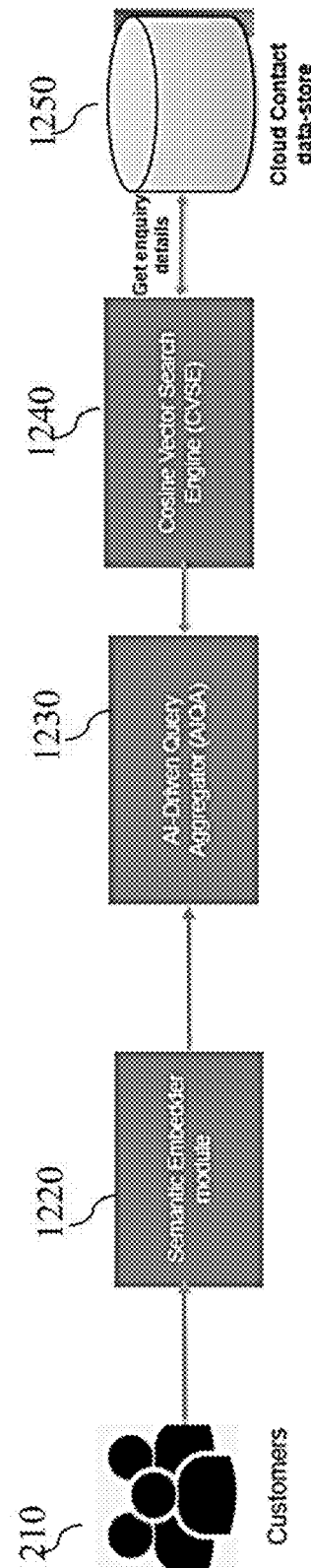
FIG. 12 schematically illustrates a workflow of matching customer queries across diverse digital channels with a response in a multichannel contact center, in accordance with some embodiments of the present invention.

FIG. 12 schematically illustrates a workflow 1200 of matching customer queries across diverse digital channels with a response in a multichannel contact center, in accordance with some embodiments of the present invention.

According to some embodiments of the present disclosure, the semantic embedder module 1220, such as semantic embedder module 120 in FIG. 1, may generate embeddings of queries received from customers 1210.

According to some embodiments of the present disclosure, the AIQI module 1230, such as AIQA module 130 in FIG. 1, may group semantically close queries (distance<θ) together.

According to some embodiments of the present disclosure, the CVSE may execute queries on vector DB to get the closest possible resolution. For example, sample of cosine query: "Where can I find help section on portal"? The vector DB is a database designed to store and search high-dimensional vectors which are numerical representations of data, such as text, images, and audio. It's used to find similar items based on meaning, not just exact words.

FIG. 13A is a screenshot 1300A of a matched response to a query, in accordance with some embodiments of the present invention.

According to some embodiments of the present disclosure, in a system, such as computerized-system 100 in FIG. 1 for matching customer queries across diverse digital channels with a response in a multichannel contact center, a response to a customer query may be presented to the agent as shown in screenshot 1300A.

Figure 13B:
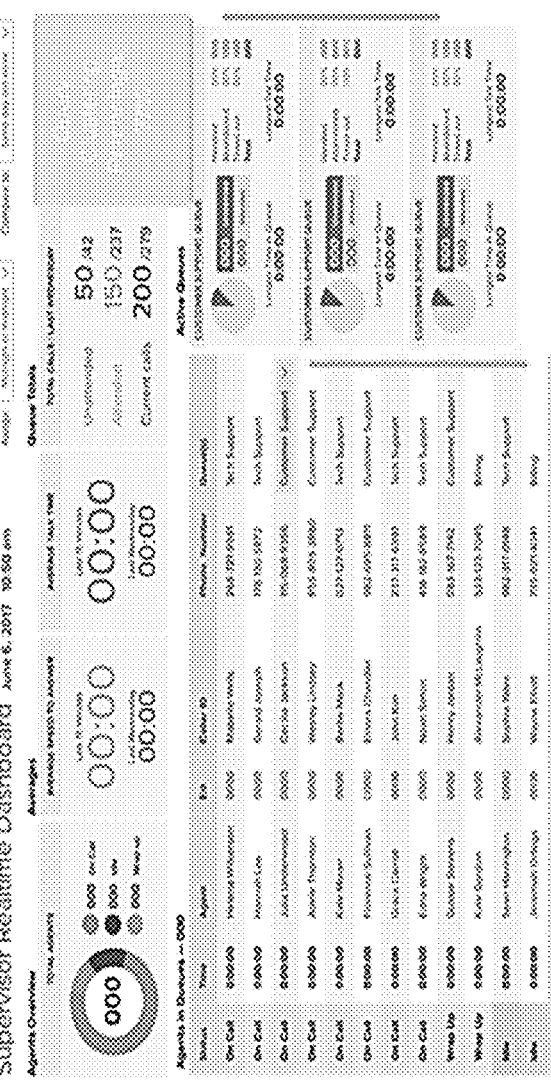
FIG. 13B is a screenshot of supervisor dashboard, in accordance with some embodiments of the present invention.

FIG. 13B is a screenshot 1300B of supervisor dashboard, in accordance with some embodiments of the present invention.

According to some embodiments of the present disclosure, in a system, such as computerized-system 100 in FIG. 1, the percentage of queries that have been clustered out of the total customer queries may be shown on the supervisor dashboard 1300B.

According to some embodiments of the present disclosure, for example, 37% of queries are grouped into clusters, such as "Order Status". The remaining 63 precent queries may be handled as unique cases.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for matching customer queries across diverse digital channels with a response in a multichannel contact center, said computerized-method comprising:

(i) receiving queries from customers via one or more types of digital communication channels;

during each preconfigured time-window:

(ii) converting each customer query in the received queries into a high-dimensional vector representation and scoring the customer query to yield a similarity score by operating a semantic embedder module;

(iii) retrieving a preconfigured similarity-threshold, and clustering each high-dimensional vector representation of the customer query to a cluster based on the preconfigured similarity-threshold and a related cluster centroid by operating an Artificial intelligence (AI) driven Query Aggregator (AIQA) module, creating a new cluster when no cluster has been found, and updating the related centroid of the cluster after the clustering, of the high-dimensional vector representation to yield one or more clusters of customer queries with semantic similarity;

(iv) matching each cluster of customer queries with the response based on a preconfigured threshold by operating a Cosine Vector Search Engine (CVSE), wherein for each cluster of customer queries with semantic similarity, the CVE is configured to:

a. extract phrases from the customer queries by using keyword extractions, b. identify an intent of the customer queries in the cluster by mapping the extracted phrases to predefined intents by operating one of: intent classification models and a lookup table;

c. fetch a corresponding response template based on the identified intent from a predefined library; and d. perform a quality check from the corresponding response template by checking that the response template matches the identified intent and includes dynamic placeholder values;

(v) automatically generating a notification for each customer query based on the matched response by operating a notification module; and (vi) automatically sending the notification to each customer that is associated with the customer query.

2. The computerized-method of claim 1, wherein said operating of the semantic embedder module comprising:

(i) receiving the customer query;

(ii) preprocessing the customer query;

(iii) classifying the customer query as one of: structured and unstructured;

(iv) converting text of the customer query that was classified as unstructured into semantic embedding by using an Artificial Intelligence (AI) model;

(v) mapping the customer query that was classified as structured to the semantic embedding;

(vi) creating the high-dimensional vector representation of the customer query based on the semantic embedding, and storing is in an embedding database, wherein said high-dimensional vector representation comprising a meaning and context of the customer query, and (vii) comparing the created high-dimensional vector representation of the customer query to high-dimensional vector representations of customer queries stored in the embeddings database to calculate a similarity score for each customer query in the embedding database.

3. The computerized-method of claim 2, wherein said preprocessing comprising: tokenizing the customer query; (ii) removing stop words; and (iii) operating lemmatization to the customer query.

4. The computerized-method of claim 2, wherein said calculating of the similarity score for each customer query is performed according to formula (I)

$$\text{similarity score } (v_i, v_j) = v_i * v_{j/\|} v_i \| \| v_j \| \tag{I}$$

whereby:

$v_i$ is the semantic embedding of the received customer query, and $v_j$ is the semantic embedding of the customer query stored in the embedding database.

5. The computerized-method of claim 1, wherein said semantic embedder module uses sentence-level contextual embedding techniques.

6. The computerized-method of claim 1, wherein said computerized-method further comprising routing queries that were not matched with the response to a human agent for a manual intervention.

7. The computerized-method of claim 1, wherein the computerized-method further comprising operating a feedback loop that continuously learns from customer interactions and agent corrections and improve clustering and intent identification accuracy.

8. A computerized-system for matching customer queries across diverse digital channels with a response in a multi-channel contact center, said computerized-system comprising:

one or more processors, said one or more processors are configured to:

(i) receive queries from customers via one or more types of digital communication channels;

during each preconfigured time-window:

(ii) convert each customer query in the received queries into a high-dimensional vector representation and score the customer query to yield a similarity score by operating a semantic embedder module;

(iii) retrieve a preconfigured similarity-threshold, and cluster each high-dimension vector representation of the customer query to a cluster based on the preconfigured similarity-threshold and a related cluster centroid by operating an Artificial intelligence (AI) driven Query Aggregator (AIQA) module, create a new cluster when no cluster has been found, and update the related centroid of the cluster after the clustering, of the high-dimensional vector representation to yield one or more clusters of customer queries with semantic similarity;

(iv) match each cluster of customer queries with the response based on a preconfigured threshold by operating a Cosine Vector Search Engine (CVSE), wherein for each cluster of customer queries with semantic similarity, said CVSE is configured to:

a. extract phrases from the customer queries by using keyword extractions, b. identify an intent of the customer queries in the cluster by mapping the extracted phrases to predefined intents by operating one of: intent classification models and a lookup table;

c. fetch a corresponding response template based on the identified intent from a predefined library; and d. perform a quality check from the corresponding response template by checking that the response template matches the identified intent and includes dynamic placeholder values;

(v) automatically generate a notification for each customer query based on the matched response by operating a notification module; and (vi) automatically send the notification to each customer that is associated with the customer query.

\* \* \* \* \*